United States Patent [19]

Seiler

[11] 3,772,065
[45] Nov. 13, 1973

[54] METHOD FOR WATERPROOFING MASONRY STRUCTURES

[75] Inventor: Claus-Dietrich Seiler, Rheinfelden, Germany

[73] Assignee: Dynamit Nobel Aktiengesellschaft, Troisdorf, Germany

[22] Filed: June 14, 1971

[21] Appl. No.: 153,115

[30] Foreign Application Priority Data
June 15, 1970  Germany.................. P 20 29 446.6

[52] U.S. Cl.................. 117/123 C, 106/2, 106/12, 106/13, 106/287 SE
[51] Int. Cl............................................. C09k 3/18
[58] Field of Search.............. 106/2, 12, 13, 287 SB, 106/287 SE; 117/123 A C

[56] References Cited
UNITED STATES PATENTS

| | | | |
|---|---|---|---|
| 2,660,736 | 12/1953 | Biefeld | 106/287 SB |
| 2,832,794 | 4/1958 | Gordon | 106/287 SE |
| 2,962,390 | 11/1960 | Fain et al. | 106/13 |
| 3,244,541 | 4/1966 | Fain et al. | 106/2 |
| 3,589,917 | 6/1971 | Hedlund | 106/12 |

*Primary Examiner*—Lorenzo B. Hayes
*Attorney*—Ralph D. Dinklage et al.

[57] ABSTRACT

Novel masonry impregnant which is alcoholic solution of alyltrialkoxysilanes having up to two alkoxy groups per silicon atom. Masonry impregnated with such solutions has increased water repellancy even if it is wet with water prior to or during impregnation.

4 Claims, No Drawings

METHOD FOR WATERPROOFING MASONRY STRUCTURES

This invention relates to silanes. It more particularly refers to a novel series of silanes and their use as water repellant impregnants for masonry.

It is known that strongly alkaline, aqueous solutions of methyl silicates can be used to impregnate masonary. Such solutions often depend upon caustic soda for their alkalinity. Impregnation of masonary with such solutions is often disadvantageous however particularly due to the high alkalinity thereof. For example, the high caustic soda content of the solution will cause a gradual removal of the organosilicon compounds from the interstices of the masonry by chemical combination thereof with the surfaces of the masonary surrounding the interstitial voids. Moreover, the caustic soda solution reacts with carbon dioxide or other acidic components of the air which gives rise to salting out and the formation of efflorescence on the masonry. In addition, it is well known that merely working with strongly alkaline solutions of anything poses certain practical problems.

Water-insoluble resins derived from certain organosilicon compounds dissolved in organic solvents, and particularly in hydrocarbons, have also been used. However, these compounds can only be employed when the masonry is perfectly dry. In addition, it has been found that masonry impregnated with such agents soils more quickly than does unimpregnated masonry. This is not particularly surprising, considering the resinous character of the impregnating agent and the fact that such resin applied to the masonry does not always fully cure.

It is known to hydrolyse various alkyltrialkoxysilanes and to use such hydrolysates as water repelling impregnating agents for masonry. It is usual to employ acids, and particularly acetic acid, as hydrolyzing agents. It has been found, however, that the acetates remaining on and in the masonry when acetic acid is used as the hydrolyzing agents have a hydrophilic effect which is contrary to the hydrophobic effect which is desired.

The present invention has as an object to provide an impregnating agent for masonry which is not afflicted with the aforesaid drawbacks.

It is another object of this invention to provide improved impregnated, hydrophobic masonry.

Other and additional objects of this invention will become apparent from a consideration of this entire specification including the claims hereof.

In accord with and fulfilling these objects, one aspect of this invention resides in a novel impregnant for masonry which comprises an alcohol or hydrocarbon solution of hydrolyzed alkyltrialkoxysilane or their lower oligomers containing up to two alkosy groups per silicon atom.

The impregnant solution according to this invention is capable of joining with and increasing the water repellancy of inorganic materials having available hydroxyl groups. Such materials are eminently exemplified by, but are not limited to, masonry surfaces and interstices. It is of particular advantage that the impregnant solutions of this invention can be used to impregnate masonry which has a residual moisture content. It is preferred that the water content of the masonry or other material being impregnated is up to about 10–20%.

The alkoxy group in the alkyltrialkoxysilane is preferably a methoxy or ethoxy group. The alkyl group of the alkyltrialkoxysilane is saturated and has from one to six carbon atoms, that is to say that alkyltrialkoxysilane is a methyl-, ethyl-, butyl-, pentyl-, or hexyltrialkoxysilane or a lower oligomer thereof. The alkyltrialkoxysilanes are per se known and are obtained by prior-art processes through esterification of the corresponding chlorosilanes ($R\text{-}SiCl_3$) with alcohols. Oligomers of these materials are obtained by reacting the above-described esters with water and continuing the condensation along with distilling off the liberated alcohol.

Alcohols having from one to three carbon atoms, and preferably ethanol, are employed as solvents. When hydrocarbon solutions are used, hydrocarbons are selected whose boiling point is in the temperature range from 50° to 150°C. Light gasolines are preferred.

The hydrolysis of the alkyltrialkoxysilanes or their lower oligomers, applied to a substrate in an alcohol or hydrocarbon solution, takes place on the substrate itself. No catalysis through chemical additives to the solutions is necessary. Substrates which lend themselves to impregnation are all inorganic materials which have components containing hydroxyl groups in any form with which Si-O bonds can link. These include cement- and lime-containing materials, and in particular exterior plaster on walls, substances such as inorganic oxides, and especially aluminum and titanium oxides.

The substrate to be impregnated can be coated with the solutions of this invention by brushing or by spraying. The quantity to be applied to the surface is determined largely by the structure of the particular substrate and by the degree of water repellency it is desired to impart. Good results are obtained with amounts as small as 25 g/m$^2$ of an impregnating agent consisting of a solution containing 20 to 99 weight percent alkyltrialkoxysilane. Impregnant Solutions containing 20 to 85 weight percent alkyltrialkoxysilanes are preferred. The impregnating agent may contain different alkyltrialkoxysilanes, that is mixtures thereof. When alcoholic solutions are used, it will make no difference so far as the effect is concerned whether the substrate is dry or contains some moisture during impregnation.

The full hydrophobic effect will manifest itself about 24 hours after impregnation. If the impregnated substrate becomes wet during that time, this will not prove detrimental but will on the contrary promote the process of the substrate absorbing the impregnant.

The advantages of the impregnating agent in accordance with the invention will now be illustrated by means of a few examples:

The hydrophobic effect of the applied solutions was investigated on cylindrical bodies having the following dimensions: Diameter, 10 cm; height, 3 cm; surface area, approximately 250 sq cm. These bodies had been made from a mixture consisting of one part portland cement and four parts commerical sand of a particle size of up to 4 mm. The impregnating agent was applied to the bodies by brushing.

After a drying time of about 24 hours, the bodies were immersed in baths with a water level of 10 cm, and subjected to a wind velocity of about 130 km/h. The water absorption was determined by weighing. The table below gives details of the results obtained with butyltrimethoxysilane (BTMOS-K) in ethanol as the solvent. The butyltrimethoxysilane oligomer was one from which nearly all methoxy groups had been condensed out. Gasoline solutions produce comparable results on dry substrates.

TABLE

| Body premoistened with water | Wt. percent of silane in alcohol solution | Amount of silane absorbed (g/m²) | Amount of water (in grams) absorbed after | | | Amount of water (in grams) absorbed by unimpregnated stone after 30 min. (approx.) |
|---|---|---|---|---|---|---|
| | | | 24h | 48h | 72h | |
| No | ¹ 80 | 130 | 4 | 4 | 5 | 30 |
| No | ¹ 60 | 72 | 3 | 4 | 4 | 30 |
| No | ¹ 40 | 80 | 3 | 4 | 4 | 30 |
| No | ¹ 20 | 40 | 3 | 5 | 8 | 30 |
| Yes (24 g water absorbed) | ¹ 60 | 72 | 2 | 3 | 5 | 30 |
| No | ² 80 | 96 | 4 | 4 | 4 | 30 |
| No | ² 60 | 72 | 4 | 4 | 4 | 30 |
| No | ² 40 | 64 | 3 | 3 | 3 | 30 |
| No | ² 20 | 24 | 2 | 4 | 5 | 30 |

¹ BTMOS.
² BRMOS-K.

What is claimed is:

1. A method of increasing the water repellancy of a masonry structure comprising impregnating said structure with a solution containing an alkyltrialkoxysilane having from one to six carbon atoms in the alkyl group and the alkoxy group being methoxy and ethoxy and an alkanol having one to three carbon atoms and removing said alkanol, said alkyltrialkoxysilane being initially present in the solution in an amount between 20 and 99 weight percent.

2. Method as claimed in claim 1 wherein said solution has more than one silane dissolved therein.

3. Method as claimed in claim 1 including applying said solution to said masonary in such proportion as to apply at least 25 grams of solids per square meter of masonary.

4. Method as claimed in claim 1, wherein said masonry is wet prior to said impregnation and wherein the solvent of said impregnant is an alkanol.

* * * * *

PO-1050
(5/69)

UNITED STATES PATENT OFFICE
CERTIFICATE OF CORRECTION

Patent No. 3,772,065          Dated November 13, 1973

Inventor(s) CLAUS-DIETRICH SEILER

It is certified that error appears in the above-identified patent and that said Letters Patent are hereby corrected as shown below:

In the Abstract, line 2

"alyltrialkoxysilanes" should be -- alkyltrialkoxysilanes --.

Column 3, in the Table
Footnote 2

"BRMOS-K" should be -- BTMOS-K --.

Signed and sealed this 14th day of May 1974.

(SEAL)
Attest:

EDWARD M. FLETCHER, JR.
Attesting Officer

C. MARSHALL DANN
Commissioner of Patents